United States Patent [19]

Piesik

[11] Patent Number: 5,422,443
[45] Date of Patent: Jun. 6, 1995

[54] ROCKET EXHAUST DISRUPTER SHAPES

[75] Inventor: Edward T. Piesik, Pomona, Calif.

[73] Assignee: Hughes Missile Systems Company, Los Angeles, Calif.

[21] Appl. No.: 80,601

[22] Filed: Jun. 24, 1993

Related U.S. Application Data

[63] Continuation of Ser. No. 776,778, Oct. 18, 1991, abandoned.

[51] Int. Cl.⁶ .............................................. B64F 1/26
[52] U.S. Cl. .................................. 181/217; 181/218; 137/896
[58] Field of Search ............... 181/210, 213, 214, 215, 181/217, 218, 219, 220, 228; 137/808, 809, 811, 896

[56] References Cited

U.S. PATENT DOCUMENTS

| | | | |
|---|---|---|---|
| 2,702,986 | 3/1955 | Kadosch et al. | 181/213 |
| 3,174,282 | 3/1965 | Harrison | 181/219 |
| 3,434,666 | 3/1969 | Shaw | 181/219 |
| 3,557,830 | 1/1971 | Raw | 137/896 |
| 3,611,726 | 10/1971 | Medawar | 181/210 |
| 3,655,007 | 4/1972 | Hilbig | 181/210 |
| 3,706,353 | 12/1972 | Ffowces-Williams et al. | 181/210 |
| 3,708,036 | 1/1973 | Duthion et al. | 181/210 |
| 3,739,872 | 6/1973 | McNair | 181/218 |
| 3,820,626 | 6/1974 | Bonneaud et al. | 181/210 |
| 3,976,160 | 8/1976 | Hoch et al. | 181/210 |
| 4,007,587 | 2/1977 | Banthin et al. | 60/204 |
| 4,280,587 | 7/1981 | Bhat | 181/213 |
| 4,284,170 | 8/1981 | Larson et al. | 181/213 |
| 4,298,089 | 11/1981 | Birch et al. | 181/213 |
| 4,498,786 | 2/1985 | Ruscheweyh | 137/896 X |
| 4,709,780 | 12/1987 | Piesik | 181/213 |
| 4,733,751 | 3/1988 | Piesik | 181/217 |
| 4,899,772 | 2/1990 | Rao | 137/896 |

*Primary Examiner*—Michael L. Gellner
*Assistant Examiner*—Khanh Dang
*Attorney, Agent, or Firm*—Charles D. Brown; Randall M. Heald; Wanda K. Denson-Low

[57] ABSTRACT

Apparatus for reducing the pressure and thermal impingement effects of a supersonic exhaust gas plume emanating from a rocket motor nozzle. A pair of wedge-shaped pieces comprise a disrupter positioned on opposite sides of the central longitudinal axis of the rocket exhaust plume in order to disrupt and disperse the plume concentration. The positioning of these pieces is such that at least a portion of the exhaust gas plume may pass between them. The disrupter defines a flow area normal to the central axis of the exhaust flow which is less than the cross sectional area of the exhaust plume at the position of the disrupter pieces. The reduced flow area causes the exhaust flow to undergo a normal shock wave adjacent the position of the disrupter device before the exhaust gases pass between the disrupter body pieces at subsonic velocity. The presence and configuration of the disrupter device disrupts and disperses the plume concentration, and the reduced flow velocity significantly reduces downstream pressure and thermal effects of the exhaust gas plume.

12 Claims, 2 Drawing Sheets

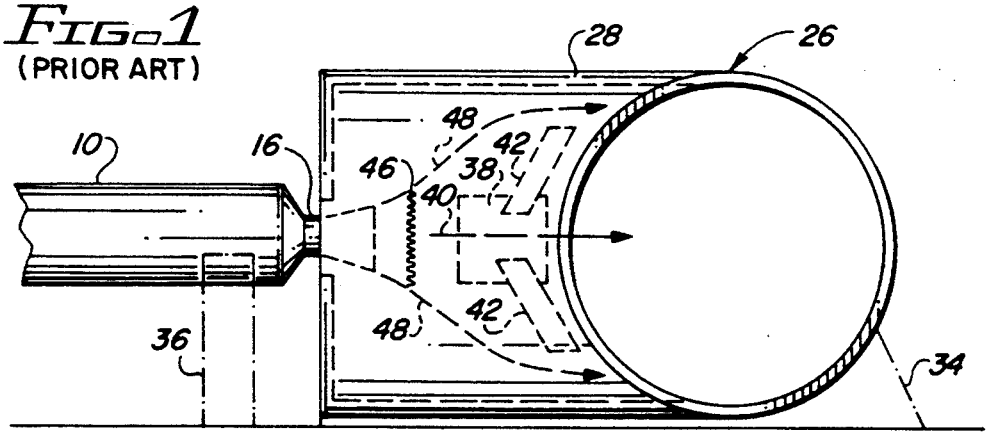
FIG. 1 (PRIOR ART)
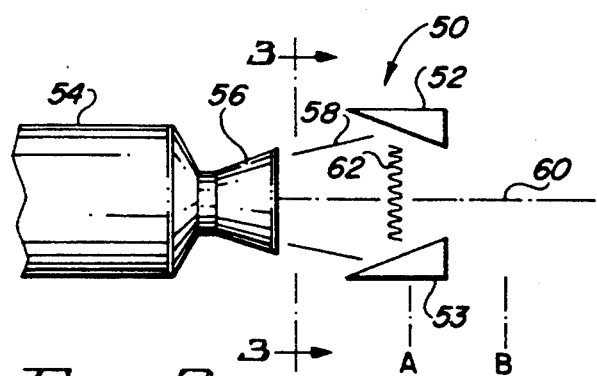
FIG. 2
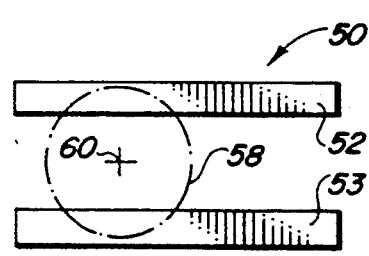
FIG. 3
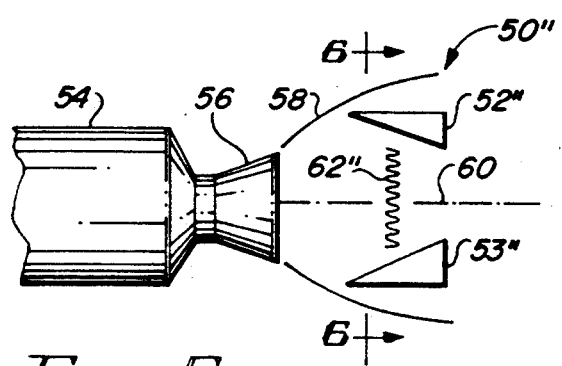
FIG. 5
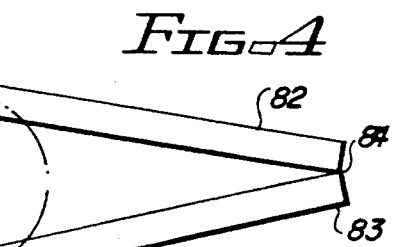
FIG. 4
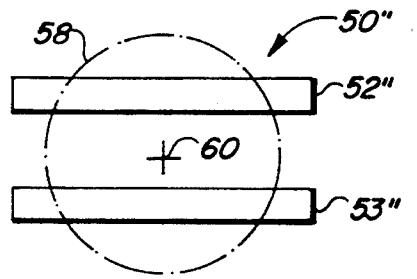
FIG. 6
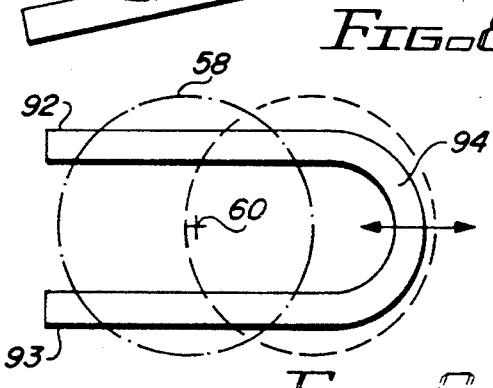
FIG. 8
FIG. 9

ROCKET EXHAUST DISRUPTER SHAPES

This is a continuation of application Ser. No. 07/776,778, filed Oct. 18, 1991, now abandoned.

BACKGROUND OF THE INVENTION

1. Field of the Invention

This invention relates to rocket exhaust control apparatus and, more particularly, to apparatus designed to diminish the undesirable heat transfer and pressure effects resulting from rocket exhaust impingement.

2. Description of the Related Art

The thermal and pressure impingement effects of exhaust gases emanating from a rocket motor nozzle extend longitudinally well beyond the exit plane of the nozzle because of the concentrated supersonic flow pattern characteristic of the exhaust gas plume. Relatively small tactical missile rocket motors have nozzle exit velocities on the order of Mach 3.5 with recovery pressures of 300 pounds per square inch and recovery temperatures in excess of 5,000 degrees Fahrenheit. These high velocities, pressures and temperatures encountered in tactical or test firings of the rocket motor remain concentrated in the plume, extending its length, and generally result in destructive final pressure and thermal impingement effects in a relatively small area to the rear of the motor. In open environment static test firings, this necessitates rugged, thermally protected structures positioned a considerable distance to the rear of the rocket nozzle, or a relatively vast open area behind the rocket. Test firings of the rocket motor into a duct or plenum require that similar features be incorporated in the plenum design to avoid destruction of the enclosure by the exhaust gas impingement. In tactical firings, the launching pad and components must also be protected. Provision of structures that can withstand the adverse temperature and pressure of the rocket motor exhaust increases the complexity and cost of the installations involved if firing safety is to be preserved.

Apparatus for reducing the pressure and thermal impingement effects of a supersonic exhaust gas plume emanating from a rocket motor nozzle is disclosed in my prior U.S. Pat. No. 4,733,751, entitled "ROCKET EXHAUST DISRUPTER", the contents of which are incorporated herein by reference. That patent discloses an exhaust tube and duct system having a disrupter body positioned within the exhaust tube along the central longitudinal axis thereof to disrupt and disperse the plume concentration. The body is generally cylindrical in shape and has a central passage through which a portion of the exhaust may pass. The body and the passage are sized and shaped to provide a flow area which is normal to the exhaust flow and less than the cross-sectional area of the exhaust plume at the position of the body. The reduced flow area causes the exhaust flow to undergo a normal Shock wave upstream of the body before passing through and around the body at a subsonic velocity. This resulting reduced flow velocity significantly reduces the downstream pressure and thermal effects of the exhaust gas plume.

A similar disrupter member is installed in a dissipator device which is the subject of my prior U.S. Pat. No. 4,709,780, entitled "EXHAUST DISSIPATOR/DISRUPTER DEVICE". The dissipator/disrupter device disclosed in that patent comprises a container having an inlet for connection to a rocket exhaust with a plurality of exhaust orifices to disperse the exhaust flow out of the container in different directions. A disrupter device like that described hereinabove is mounted within the container more or less like the disrupter device in the exhaust tube of U.S. Pat. No. 4,733,751.

The principle of disrupting the rocket exhaust flow by disrupter devices such as those disclosed in the two patents referenced hereinabove is based upon the discovery that the undisturbed supersonic rocket exhaust impingement heat transfer and recovery pressure effects can be substantially reduced if the Mach number of the exhaust, at the location of impingement, can be significantly lowered. The disrupter devices of my two prior patents are disclosed as generally cylindrical shapes with tapered bores which totally enclose at least a portion of the rocket exhaust at a particular axial location in the exhaust plenum. The present invention is concerned with particularly shaped devices which are arrayed in positions relative to the rocket exhaust which are significantly different from the tapered cylinder disrupters previously disclosed. These shapes are not hollow, are not cylindrical and do not enclose any portion of the exhaust plume.

I am aware of the following patents which generally relate to the subject of controlling or affecting jet engine exhaust gas streams U.S. Pat. Nos.:

3,174,282 Harrison
3,611,726 Medawar
3,655,007 Hillbig
3,706,353 Ffowces-Williams et al
3,708,036 Duthion et al
3,820,626 Bonneaud et al
3,976,160 Hoch et al
2,702,986 Kadosch et al
3,434,666 Shaw
3,739,872 McNair
4,007,587 Banthin et al The first seven of these patents deal with noise suppressors for jet engines. The next three pertain to thrust reversers, gas deflectors or defusers. The last patent in this group relates to suppression of infrared radiation from a jet engine. All of these patents relate to jet engine exhausts; none is concerned with rocket exhausts which are much more intense and present different problems from jet engine exhausts. Finally, none of these patents indicates any appreciation of developing a normal shock wave in an exhaust plume to reduce the gas flow to subsonic velocity.

SUMMARY OF THE INVENTION

In brief, particular arrangements in accordance with the present invention comprise separate pieces, rather than a single disrupter device, which are arranged in pairs at a selected axial position so as to intercept at least a portion of the exhaust plume.

These pieces basically comprise a pair of wedges which are spaced apart from each other to provide an opening between them. The wedges are arrayed on opposite sides of the longitudinal axis of the rocket exhaust plume. However, the opening between the wedges need not be symmetrical with, nor aligned with, the rocket exhaust axis.

In accordance with various aspects of the present invention, the wedges can have different cross-sectional shapes, such as triangular, convex, concave, or other shapes which result in the space between the wedges at the downstream side being less than the corresponding space at the entrance side. The wedges can be spaced and positioned so as to completely intercept the exhaust flow or to intercept exhaust flow only partially. However, none of the arrangements of this invention wholly enclose the exhaust. The disrupter pieces of a particular pair may even be of different cross sectional shapes. Furthermore they may be positioned at different angles with respect to each other and at different distances from the exhaust axis. If the disrupter pieces are symmetric with respect to the exhaust axis, the exhaust centerline is not displaced. However, non-symmetrical aligned disrupter configurations can alter the direction of the rocket exhaust centerline downstream of the disrupter. In all of these varying embodiments of the invention, the action of the disrupter is to cause a normal shock wave to occur in the rocket exhaust where the normal shock wave would not exist if the disrupter were not in place.

BRIEF DESCRIPTION OF THE DRAWING

A better understanding of the present invention may be gained from a consideration of the following detailed description, taken in conjunction with the accompanying drawing in which:

FIG. 1 is a schematic diagram of a prior art system disclosed in my U.S. Pat. No. 4,733,751;

FIG. 2 is a schematic side elevation of one particular arrangement in accordance with the present invention;

FIG. 3 is a schematic orthogonal view of a portion of the arrangement of FIG. 2, taken at the position of the line 3—3, looking in the direction of the arrows;

FIG. 4 is a view like that of FIG. 3 but representing a variant of the arrangement depicted in FIGS. 2 and 3;

FIG. 5 is a schematic side elevational view of a second particular arrangement in accordance with the invention;

FIG. 6 is a transverse view taken at the position 6—6 in FIG. 5, looking in the direction of the arrows;

FIG. 8 is a schematic view like that of FIG. 3, illustrating another variant arrangement of the invention;

FIG. 9 is a schematic view like that of FIG. 6 illustrating still another variant of the invention.

DETAILED DESCRIPTION OF THE PREFERRED EMBODIMENTS

Figure 7:
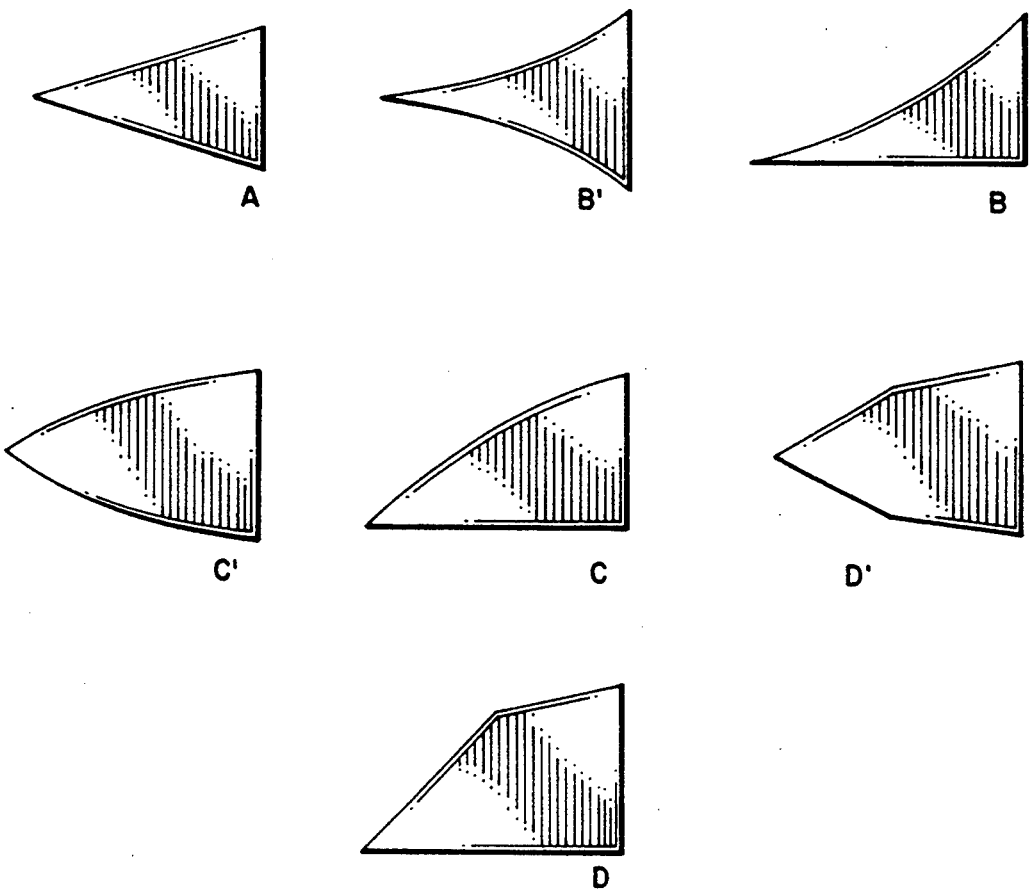
FIG. 7, views A, B, B', C, C', D and D', illustrates a number of different cross sectional shapes which may be employed in arrangements of the present invention.

Rocket exhaust disrupter apparatus of applicant's prior patent may be described in the context of a test firing of a rocket motor when the exhaust gas emanating from the motor nozzle is directed into a plenum chamber or duct, as indicated in FIG. 1. This shows a rocket motor 10 mounted to exhaust into the interior of a plenum chamber 26 of circular cross section. The plenum 26 has an entrance section 28 and two exhaust gas exits 30 in the T-shaped plenum. The plenum 26 is mounted in a fixed ground support structure 34 and the rocket motor 10 is held in a ground mounted test fixture 36 to establish and maintain the central longitudinal axis of the motor 10 coaxial with the central longitudinal axis 40 of the plenum entrance section 28. A disrupter body 38 is mounted on the central longitudinal axis of the plenum entrance section 28 and spaced from the motor exhaust nozzle 16 so as to be enveloped by the exhaust plume exiting the nozzle 16 when the rocket 10 is ignited. The disrupter body 38 is supported in the plenum entrance section 28 by a plurality of struts 42 which attach the body to the wall of the plenum.

The disrupter body 38 of the prior art arrangement depicted in FIG. 1 is designed with a central passage or bore through which a portion of the motor exhaust gases may pass. In the system of my prior part, depicted in FIG. 1, the disrupter body 38 presents a cross-sectional area opposing the flow of exhaust gases which is less than the cross-sectional area of the exhaust gas plume at the position of the disrupter body 38. Due to the reduction in the exhaust flow area caused by the disrupter 38, exhaust gases may pass through the central passage as well as around the body 38 only after undergoing a normal shock wave upstream of the disrupter body, transforming the exhaust gas flow velocity from supersonic to subsonic magnitude. The exhaust which does not pass through the central passage of the disrupter body 38 deflects around it as indicated by the arrows 48. The shock wave is represented by the figure designated by the reference numeral 46.

Because of the velocity reduction and alternative exhaust gas flow paths at the disrupter body 38, the impingement loads on the disrupter 38 and downstream of the disrupter are greatly reduced.

In both of my prior patents identified hereinabove, the disrupter device was disclosed as a cylindrical body having a central bore defining a passage therethrough. The walls of the cylindrical disrupter device were tapered in thickness so as to define a frusto-conical central passage diminishing in diameter with distance from the exhaust nozzle. The disrupter device was mounted downstream of the exhaust nozzle and had a central axis which was coaxially aligned with the central axis of the rocket exhaust plume. I have discovered a number of variations of disrupter devices which may be used to perform the functions of the devices disclosed in my prior patents and these are the subject of the invention disclosure herein.

FIGS. 2 and 3 are schematic orthogonal views showing a disrupter device 50 of the present invention mounted in the path of an exhaust plume 58 exiting a nozzle 56 of a rocket 54. The disrupter device 50 comprises a pair of triangular cross section bars or wedges 52, 53 which are positioned on opposite sides of the central axis 60 of the rocket/nozzle/exhaust combination. The bars 52, 53 are spaced equidistant from the central axis 60 and sufficiently far apart from each other to totally encompass the exhaust plume 58 at the position downstream from the nozzle 56 where the disrupter device 50 is mounted. While the vertical alignment of the bars 52, 53 making up the disrupter device 50 is symmetrical with respect to the central axis 60, it will be noted (FIG. 3) that the transverse position of the bars 52, 53 is offset in the horizontal plane, relative to the central axis 60. The positioning of the disrupter device 50 as shown in FIG. 2 results in the development of a normal shock wave between the two pieces 52, 53 as indicated by the symbol designated by the reference numeral 62. This normal shock wave produces the effect described above with respect to the prior art apparatus of FIG. 1 by reducing the Mach number of the exhaust gases in the plume 58 to a subsonic velocity.

FIG. 4 is a view like that of FIG. 3 except that, whereas the disrupter device 50 of FIGS. 2 and 3 is mounted in the exhaust plume 58 at a position A, the disrupter device 50' of FIG. 4 may be considered to be mounted farther away from the rocket nozzle 56 as in the position B indicated in FIG. 2. The elements depicted in FIG. 4 are essentially the same as those depicted in FIG. 3 and have been given the same reference numerals with the addition of a prime symbol.

Because of its position farther downstream of exhaust plume 58, the exhaust plume is only partially intercepted by the bars 52', 53'. Also, it will be noted that the two bars of the disrupter device 50' are no longer symmetrically positioned in the vertical direction relative to the central axis 60, although the pieces 52', 53' are symmetrically positioned in the transverse horizontal direction relative to the central axis 60. This non-symmetrical configuration relative to the centerline 60 may alter the direction of the rocket exhaust centerline downstream of the disrupter device 50.

FIGS. 5 and 6 are schematic orthogonal views of a variation of the arrangement of FIGS. 2 and 3. In these views, like elements are given like reference numerals with double prime symbols where appropriate. A disrupter device 50" is shown positioned symmetrically in both the horizontal and vertical directions relative to the central axis 60. Furthermore, the position and spacing of the pieces 52", 53" are such that only a core portion of the exhaust 58 is impinged by the disrupter device 50". Part of the exhaust 58 flows above and below the pieces 52", 53" in a symmetrical manner. The disrupter device 50" also develops a normal shock wave 62" which effectively lowers the Mach number and reduces the heat transfer and pressure effects on elements which may be impinged by the exhaust gas flow downstream of the disrupter device 50".

The disrupter devices of the present invention, or at least the operative portions thereof, as shown in FIGS. 2 and 5, are in the shape of wedges. These wedges are pointed in the upstream direction; that is the pointed edge of the wedge faces in the direction of the rocket 54. The wedges may be of different shapes to achieve the desired effect. In FIGS. 2 and 5, the wedges are shown as triangles; however, other shapes may be employed to achieve comparable results. Some of these other shapes are depicted in FIG. 7. View A shows a wedge shape in the form of an isosceles triangle.

View B of FIG. 7 shows an alternative shape for one of the wedge pieces employed in the disrupter device of the present invention which is flat along the base and concave curved along the other side. The view of B' shows a corresponding symmetrical wedge shape wherein both sides of the wedge are concave curved and the wedge is symmetrical about the horizontal plane (as viewed in FIG. 7).

View C of FIG. 7 shows still another wedge shape which is flat along the base and convex curved along the opposite side. View C' shows a corresponding double convex curved wedge wherein both of the opposite sides of the wedge are convex curved and symmetrically arrayed about the horizontal plane.

View D shows still another shape for the wedge pieces of the disrupter device in which the base is flat while the opposing side comprises two angled planar surfaces oriented at different angles and intersecting along the line approximately midway between the point and the tail of the wedge. View D' shows a corresponding shape which is symmetrical about its horizontal centerline, the opposing sides each comprising two planar surfaces extending at different angles and intersecting at a line forward of the midway point between nose and tail.

It is not essential for the effective operation of arrangements in accordance with the present invention that the two bars comprising the disrupter device be parallel to each other. FIG. 8 is a schematic view looking in the direction of the horizontal axis 60 of the exhaust plume 58 with wedge bars 82, 83 being non-parallel to each other. They are positioned on opposite sides of the centerline 60 in a position to completely intercept the exhaust flow 58 and effectively intersect with each other at a point 84 which may serve as the structure to which the bars 82, 83 are mounted to a support arrangement.

FIG. 9 shows another possible configuration wherein the wedges 92, 93 are portions of a U-shaped combination, the wedges 92, 93 being supported by the bottom portion 94 of the U-shaped disrupter device 90 which supports the pieces 92, 93 in their depicted juxtaposition. The doubled-ended arrow in FIG. 9 indicates that the disrupter device 90 may be movable transversely in the horizontal direction relative to the central axis 60 of the exhaust plume 58 so that the exhaust plume, in the position indicated by the broken line circle, may impinge not only the side portions 92, 93, but the bottom portion 94 of the U-shaped disrupter device 90.

Figure 10:
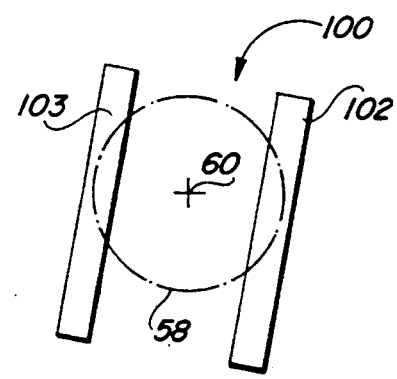
FIG. 10 is a transverse schematic view illustrating still another variant arrangement of the present invention.

FIG. 10 schematically represents still another orientation in which the disrupter device 100 is shown comprising the pieces 102, 103 in a vertical configuration. It may be more convenient to support the pieces 102, 103 in this orientation than in those which are shown in some of the other figures. The effect, however, is the same: a normal shock wave is developed by the disrupter device which lowers the Mach number of exhaust gases and ameliorates the deleterious effects of exhaust gas impingement on objects which may be downstream of the disrupter.

It should be clear from the above description and the drawing figures discussed therein that the desired reduction in the exhaust flow area to be developed by the disrupter device can be achieved by a disrupter configuration such as the double wedge structure of the present invention. A pair of wedges on opposite sides of the central axis of the exhaust plume are effective to establish the normal shock wave in the exhaust gas stream, effectively transforming the exhaust gas flow velocity from supersonic to subsonic magnitude. To achieve this result, the opening between the wedges need not be symmetrical with, or aligned with, the rocket exhaust axis. The cross sectional shape of the wedge pieces can be triangular, either right triangle or isosceles; convex curved, either single or double convex; concave curved, either single or double concave; or formed in other shapes which result in the dimension of the downstream opening between the wedges being less than the dimension of the upstream opening, as far as the supersonic exhaust flow area is concerned. The exhaust flow can either be completed intercepted or only partially intercepted by the wedges comprising the disrupter device. The wedge pieces need not be parallel, equidistant from the exhaust axis, or of the same cross sectional shape.

The action of the disrupter device is to cause a normal shock wave to occur in the rocket exhaust where a normal shock wave would not exist in the undisturbed rocket exhaust. If the disrupter device is symmetrically positioned and aligned with the exhaust axis, the exhaust centerline is not displaced. However, non-symmetrically aligned disrupter configurations can alter the direction of the rocket exhaust centerline downstream of the disrupter device.

Although there have been described hereinabove various specific arrangements of rocket exhaust disrupter shapes in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Apparatus for disrupting a supersonic exhaust plume emanating from a nozzle along a central longitudinal axis, the apparatus comprising:
    a pair of transversely oriented wedge-shaped pieces arrayed on opposite sides of said axis and situated in a position downstream of said nozzle to intercept at least a portion of said exhaust plume and establish a normal shock wave in said plume in the vicinity of said pieces Such that the Mach number is reduced in magnitude from supersonic to subsonic for exhaust gases flowing past said pieces, thereby reducing the damaging effects of exhaust gas impingement on objects downstream of the position of the wedge-shaped pieces;
    wherein the wedge-shaped pieces are separate members in the form of individual bars; and
    wherein each of said members comprises a pair of faces, each of said faces comprising a pair of differently angled planar surfaces intersecting along a junction line, said faces of each pair meeting to form an edge and being oriented such that said edge faces upstream of said exhaust gas plume.

2. Apparatus for disrupting a supersonic exhaust plume emanating from a nozzle along a central longitudinal axis, the apparatus comprising:
    a pair of transversely oriented wedge-shaped pieces arrayed on opposite sides of said axis and situated in a position downstream of said nozzle to intercept at least a portion of said exhaust plume and establish a normal shock wave in said plume in the vicinity of said pieces such that the Mach number is reduced in magnitude from supersonic to subsonic for exhaust gases flowing past said pieces, thereby reducing the damaging effects of exhaust gas impingement on objects downstream of the position of the wedge-shaped pieces;
    wherein the wedge-shaped pieces are elongate members corresponding to the sides of a U-shaped structure; and
    wherein each of said members comprises a pair of faces, each of said faces comprising a pair of differently angled planar surfaces intersecting along a junction line, said faces of each pair meeting to form an edge and being oriented such that said edge faces upstream of said exhaust gas plume.

3. The apparatus of claim 1 or claim 2 wherein said members constitute a disrupter device.

4. The apparatus of claim 3 wherein said disrupter device is positioned with said members being symmetrically oriented on opposite sides of said central axis and equally spaced therefrom.

5. The apparatus of claim 3 wherein said disrupter device is asymmetrically positioned relative to said central axis so that said members are spaced on opposite sides of the central axis at different distances therefrom.

6. The apparatus of claim 3 wherein the disrupter device is positioned to intercept all of the gases in said exhaust plume.

7. The apparatus of claim 3 wherein said disrupter device is positioned within said exhaust plume to intercept only a portion thereof.

8. The apparatus of claim 1 wherein said members are oriented in a horizontal orientation on opposite sides of said central axis.

9. The apparatus of claim 1 wherein said members are oriented in a vertical orientation on opposite sides of said central axis.

10. The apparatus of claim 1 wherein said members are arrayed parallel to each other.

11. The apparatus of claim 1 wherein said members are arrayed non-parallel to each other and intercept at a point outside the exhaust plume.

12. The apparatus of claim 4 wherein said disrupter device is movable in a direction transverse to said central axis and parallel to the orientation of said members.

* * * * *